(12) United States Patent
Undire (10) Patent No.: US 12,173,671 B2
(45) Date of Patent: Dec. 24, 2024

(54) SINGLE STAGE TO ORBIT ROCKET ENGINE

(71) Applicant: Atharva Undire, Mumbai (IN)

(72) Inventor: Atharva Undire, Mumbai (IN)

(*) Notice: Subject to any disclaimer, the term of this patent is extended or adjusted under 35 U.S.C. 154(b) by 0 days.

(21) Appl. No.: 18/681,099

(22) PCT Filed: Jul. 19, 2022

(86) PCT No.: PCT/IB2022/056623
§ 371 (c)(1),
(2) Date: Feb. 5, 2024

(87) PCT Pub. No.: WO2023/012559
PCT Pub. Date: Feb. 9, 2023

(65) Prior Publication Data
US 2024/0369028 A1 Nov. 7, 2024

(30) Foreign Application Priority Data
Aug. 5, 2021 (IN) .............................. 202121035262

(51) Int. Cl.
*F02K 9/97* (2006.01)
*B64G 1/40* (2006.01)
(Continued)

(52) U.S. Cl.
CPC .................. *F02K 9/97* (2013.01); *B64G 1/40* (2013.01); *F02K 7/08* (2013.01); *F02K 7/10* (2013.01);
(Continued)

(58) Field of Classification Search
CPC ..... F02K 7/08; F02K 7/10; F02K 7/12; F02K 9/42; F02K 9/44; F02K 9/52; F02K 9/62;
(Continued)

(56) References Cited

U.S. PATENT DOCUMENTS 2,735,263 A * 2/1956 Charshafian .............. F02K 7/18
60/260
3,712,059 A 1/1973 Drexhage
(Continued)

OTHER PUBLICATIONS

Undire, A., PCT/IB2022/056623, PCT International Search Report, Oct. 31, 2022, 3 pages.
(Continued)

*Primary Examiner* — Kyle Robert Thomas
(74) *Attorney, Agent, or Firm* — Rahman LLC (57) ABSTRACT

An aerial vehicle engine is proposed which may be powered an adjustable, vortex-based virtual aerospike engine. The vehicle may also include a combustion chamber which may be coupled to the exit nozzle. The combustion chamber may include one or more gas inlets, one or more blanket inlets and one or more main inlets. The gas inlet may be configured to let in a column of gases into the combustion chamber in a direction parallel to the direction of the rocket with minimal angular velocity to prevent the column of gases from mixing with a vortex of propellants or gases. The one or more main inlets may be configured to spray fuel or oxidizer at a specific angle, where the angle may be adjustable for forming the vortex of propellants or gases. The one or more blanket inlets may be configured to spray fuel/oxidizer/(inert) coolant at a specific angle, where the angle may be adjustable and may or may form a vortex, a stagnant pocket of gases (acting as a blanket) or a stream of gases that exits through the exit nozzle. Further, the column of gases inside the combustion chamber leading up to the exit nozzle may form a virtual aerospike nozzle, the virtual aerospike nozzle may exit the gases to propel the vehicle, wherein the virtual aerospike nozzle may not require cooling.

10 Claims, 10 Drawing Sheets

(51) Int. Cl.
*F02K 7/08* (2006.01)
*F02K 7/10* (2006.01)
*F02K 7/12* (2006.01)
*F02K 9/42* (2006.01)
*F02K 9/44* (2006.01)
*F02K 9/52* (2006.01)
*F02K 9/62* (2006.01)
*F02K 9/64* (2006.01)
*F02K 9/66* (2006.01)
*F02K 9/78* (2006.01)
*F02K 9/90* (2006.01)

(52) U.S. Cl.
CPC ................. *F02K 7/12* (2013.01); *F02K 9/42* (2013.01); *F02K 9/44* (2013.01); *F02K 9/52* (2013.01); *F02K 9/62* (2013.01); *F02K 9/64* (2013.01); *F02K 9/66* (2013.01); *F02K 9/78* (2013.01); *F02K 9/90* (2013.01)

(58) Field of Classification Search
CPC ..... F02K 9/64; F02K 9/66; F02K 9/78; F02K 9/80; F02K 9/86; F02K 9/90
See application file for complete search history.

(56) References Cited

U.S. PATENT DOCUMENTS

| | | | |
|---|---|---|---|
| 4,448,354 A * | 5/1984 | Reznick | B64C 29/00 239/265.17 |
| 6,857,261 B2 * | 2/2005 | Wilson | F02K 7/20 60/248 |
| 6,865,878 B2 | 3/2005 | Knuth et al. | |
| 6,983,587 B2 * | 1/2006 | Shumate | F02K 9/97 60/211 |
| 9,410,503 B2 * | 8/2016 | Munson, Jr. | F02K 9/62 |
| 11,220,979 B1 * | 1/2022 | Davis | F23R 3/46 |

OTHER PUBLICATIONS

Undire, A., PCT/IB2022/056623, PCT Written Opinion, Oct. 31, 2022, 5 pages.

* cited by examiner

SINGLE STAGE TO ORBIT ROCKET ENGINE

TECHNICAL FIELD

The present disclosure relates generally to a single stage to orbit rocket. More specifically, it relates to a system for an aerospike rocket engine for powering the rocket to reach orbit in a single stage.

BACKGROUND

Background description includes information that may be useful in understanding the present invention. It is not an admission that any of the information provided herein is prior art or relevant to the presently claimed invention, or that any publication specifically or implicitly referenced is prior art.

Currently, most rockets are 'Multi Stage to Orbit' (MSTO), as the rocket nozzles cannot compensate for the massive changes in the atmospheric pressure as altitude increases which may cause under-expansion or over-expansion resulting in either loss of structural integrity of the engine nozzle walls or increased drag. This may increase the overall costs of rockets may make them expensive. As of now, there aren't any 'Single Stage to Orbit' (SSTO) rockets available, although there may be theoretical designs of Altitude Compensating Nozzles like the 'Aerospike', they may not be very practical, as they may have a higher surface area to cool, and so need larger cooling systems which can make the rocket too heavy.

There is a need of improved rocket which may address current problems with rocket engines regarding altitude compensation, surface cooling, etc. It is also required that rocket engine should have lower cooling need than current SSTO designs to enable a higher payload capacity. Further, the rocket engine should also be customizable, adjustable and pose minimum risk unlike MSTO rockets during procedures like staging, which may have a high chance of failing.

Therefore, there is a need to provide an efficiently designed rocket engine which can obviate aforementioned limitations in the art.

OBJECTS OF THE INVENTION

A general object of the present disclosure is to provide a rocket engine which can power a Single Stage to Orbit rocket (SSTO) and obviate the above mentioned limitations of conventional rockets.

An object of the present disclosure is to provide an aerospike nozzle-based rocket engine which doesn't suffer from cooling issues.

Another object of the present disclosure is to provide a rocket engine capable of solving the issue of altitude compensation and staging.

Another object of the present disclosure is to provide a rocket engine having lower cooling needed than current SSTO designs and enabling a higher payload capacity.

Another object of the present disclosure is to provide a rocket engine which is highly customizable and adjustable to the specific needs, both during the design phase and in-flight.

Another object of the present disclosure is to provide a rocket engine which is less risky than Multi Stage to Orbit (MSTO) rockets.

SUMMARY

Aspects of the present disclosure relate to a single stage to orbit rocket. More specifically, it relates to a system for single stage to orbit rocket powered by an altitude compensating vortex-based rocket engine.

In an embodiment, the present disclosure provides an aerial vehicle which may include an adjustable, vortex-based aerospike engine for powering the vehicle, and a combustion chamber integrated with the nozzle. The combustion chamber may include one or more main inlets which may be configured to spray fuel or oxidizer at a specific angle, where the angle may be adjustable for forming a vortex of propellants or gases inside the combustion chamber. The combustion chamber may also include one or more gas inlets which may be configured to let in a column of gases into the combustion chamber in a direction parallel to the direction of the vehicle with minimal angular velocity to prevent the column of gases from mixing with a vortex of propellants or gases. The column of gases inside the combustion chamber may form a virtual aerospike nozzle, the virtual aerospike nozzle may exit the gases to propel the vehicle in a specific direction, wherein the virtual aerospike nozzle may not require cooling.

In another embodiment, the combustion chamber may further include one or more blanket inlets to create a blanket of gases between one or more walls of the combustion chamber, or release an inert coolant or the fuel or oxidizer in the combustion chamber if the fuel or oxidizer has not been released by the one or more main inlets.

In another embodiment, the combustion chamber may further include one or more nozzle film cooling inlets for letting in a coolant that may be inert onto the nozzle.

In another embodiment, the end of the combustion chamber and/or the nozzle down to the exit may further include one a set of ridges or grooves for adjusting direction of propellants or gases spinning in the vortex of propellants or gases such that the propellants or gases exit the chamber in a direction parallel to the rocket.

In another embodiment, the column of gases may form a spiked wick at the end of the nozzle based on adjusting at least one of: pressure of the column, velocity of the column, angle of the column, or one or more attributes of the vortex of the propellants or gases.

In another embodiment, the column of gases may be adjusted based at least on any or a combination of one or more atmospheric conditions, or propellant type, or one or more payload attributes.

In another embodiment, the nozzle may include an exit area, which may be connected to a constricted or expanded topology (like a conventional converging-diverging nozzle) through which the vortex of propellants or gases spin and exit the nozzle, wherein the exit area is adjustable.

In another embodiment, the one or more main inlets may include either one or more singular fuel or oxidizer inlets, or one or more dual fuel or oxidizer inlets.

In another embodiment, one or more parameters associated with one of the gas inlets, the one or more main inlets, or the one or more blanket inlets may be adjusted based on one or more atmospheric conditions, wherein the one or more parameters may include velocity, pressure, angle, etc.

In another embodiment, the blanket of gases may include any or a combination of unreacted propellant, inert coolant, air, or any other suitable substance for the engine wherein the blanket of gases may be in a rotating vortex form.

Various objects, features, aspects and advantages of the inventive subject matter will become more apparent from the following detailed description of preferred embodiments, along with the accompanying drawing figure(s) in which like numerals represent like components.

BRIEF DESCRIPTION OF THE DRAWINGS

The accompanying drawings are included to provide a further understanding of the present disclosure, and are incorporated in and constitute a part of this specification. The drawing(s) illustrate exemplary embodiments of the present disclosure and, together with the description, serve to explain the principles of the present disclosure. The diagram(s) are for illustration only, which thus is not a limitation of the present disclosure.

Persons skilled in the art will appreciate that elements in one or more figures are illustrated for simplicity and clarity and may have not been drawn to scale. For example, the dimensions of some of the elements in the figure may be exaggerated relative to other elements to help to improve understanding of various exemplary embodiments of the present disclosure. Throughout the drawing(s), it should be noted that like reference numbers are used to depict the same or similar elements, features, and structures.

DETAILED DESCRIPTION

In the following description, numerous specific details are set forth in order to provide a thorough understanding of embodiments of the present invention. It will be apparent to one skilled in the art that embodiments of the present invention may be practiced without some of these specific details.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all groups used in the appended claims.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Embodiments explained herein relate to a single stage to orbit rocket; particularly, it relates to a single stage to orbit rocket powered by a 'virtual-nozzle engine'.

In an embodiment, the rocket engine may require minimal cooling due to low surface area. The rocket engine may address problems, described in the background section, with contemporary rocket engines.

In another embodiment, the rocket engine may require minimal cooling due to low surface area. The rocket engine may be based on a completely new arrangement and design for the combustion chamber, the propellant inlets, and the nozzle. The rocket engine may use a column of gases to form a 'virtual aerospike' in addition to other optional methods such as film cooling. Further, the rocket engine may avoid undue increase in an effective nozzle surface area and potentially enable easy integration of film cooling and vortex engine combustion chamber cooling.

In another embodiment, the use of air column, in the rocket engine, may increase level of control on the engine and reduce the surface area exposed to hot propellants while being altitude compensating. The rocket engine may have a low nozzle surface area which can minimize the need for heavy and expensive cooling systems. The rocket engine may be designed in such a way that it can be easily integrated with a vortex engine combustion chamber cooling system to further decrease the level of cooling. The rocket engine may work by using a central column of gases propelled at one or more specified velocities depending on the conditions which may enable adjustment of an exit area, around which a vortex of the propellants/gases may spin which exit the nozzle to propel the rocket.

In an embodiment, the gaseous substance can be anything from the propellant itself to a store of an (inert) gas to air sucked in through inlet vents from the external atmosphere, or a combination of these. The column of gases may be adjusted in such a way that under those atmospheric conditions and type of propellant used, the gases create a 'spiked wick' just like in an aerospike at the end of the exit nozzle by adjusting the pressure, velocity, angle, etc. of the column and the vortex gases. A set of ridges/grooves may be used to direct the direction of the propellant spinning in the vortex to exit parallel to the rocket.

FIGS. 1A-1D illustrate rocket engine cross section without and with columns of propellants/gases in a combustion chamber of a proposed rocket, in accordance with embodiments of the present disclosure.

In an embodiment, as illustrated, an Inlet 102 may be used in the combustion chamber for letting in the column of gases at an adjusted velocity, pressure, angle, etc. according to the specific atmospheric condition(s). The inlet 102 may let in the column of gases in a highly directional manner, for example, parallel to the direction of the rocket with minimal angular velocity or low deviation to prevent the column of gases from mixing with the vortex gases. The column of gases may act like a 'virtual aerospike' at the end of the nozzle. In an exemplary aspect, the chamber may or may not include a nozzle.

In another embodiment, the combustion chamber may include one or more main inlets 106. The main inlet(s) 106 can be singular fuel/oxidizer inlets, or dual fuel/oxidizer inlets. The main inlet(s) 106 can be used for spraying the fuel at a specific angle which may be adjustable in order to from a vortex inside the walls of the combustion chamber (or may be separated by the materials injected by the blanket inlet column) and around the column of gases at its centre. The vortex of gases may exit the nozzle as the main propellant.

In another embodiment, the combustion chamber may optionally include one or more blanket inlets 104 for letting in either inert coolant for film cooling to create a blanket between the combustion chamber walls or release the fuel/oxidizer if the main inlet(s) don't release both. This may or may not be released as a vortex depending on one or more conditions. The column of gases may be only optional, and if used, the column of gases may not exit the nozzle at all. Alternatively, the column of gases may exit just a little at the edges as a film coolant for the nozzle.

In another embodiment, the combustion chamber or exit nozzle may optionally include one or more nozzle film cooling inlets 108 for letting in inert coolants at the nozzle only. This may not be used/necessary for certain condition(s) and/or if the blanket inlet(s) are releasing coolant (not propellant reactant) for the complete length of the combustion chamber and nozzle.

Figure 1A:
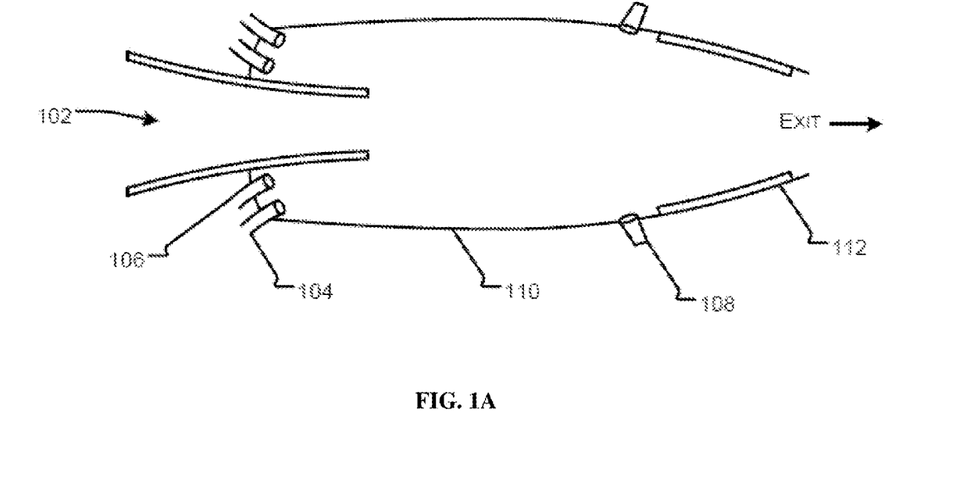
FIGS. 1A-1D illustrate rocket engine cross section without and with columns of propellants/gases in the proposed rocket engine, in accordance with embodiments of the present disclosure.
Figure 1B:
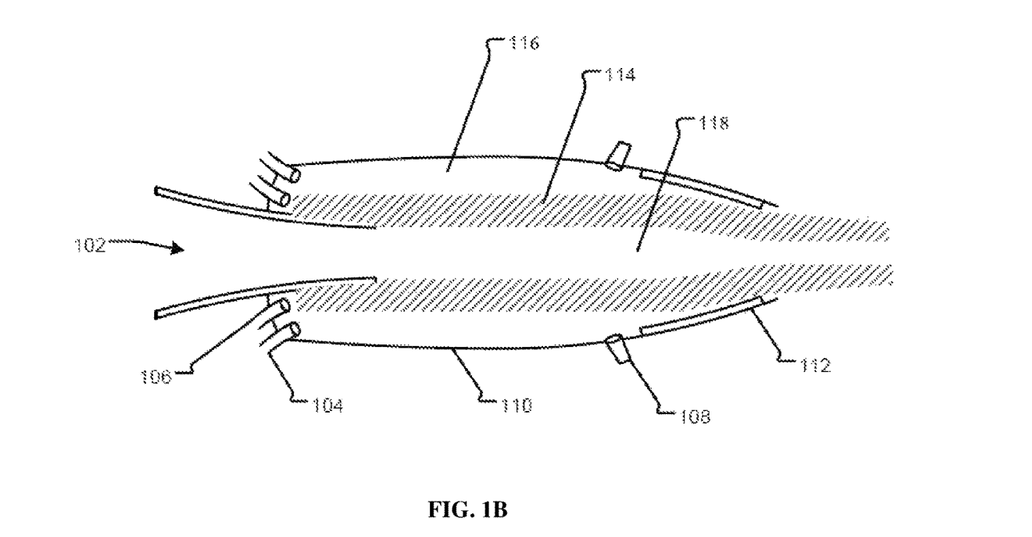
Figure 1C:
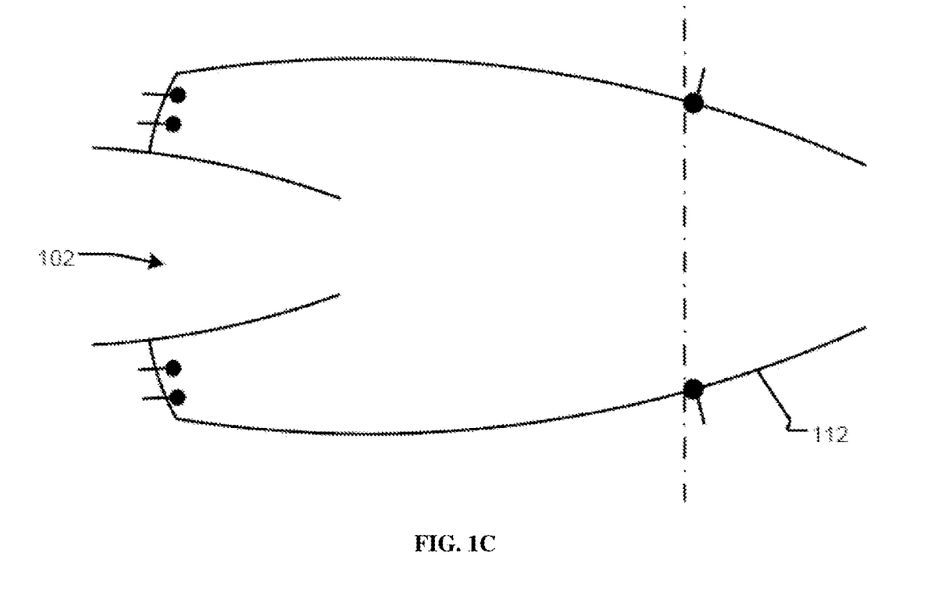
Figure 1D:
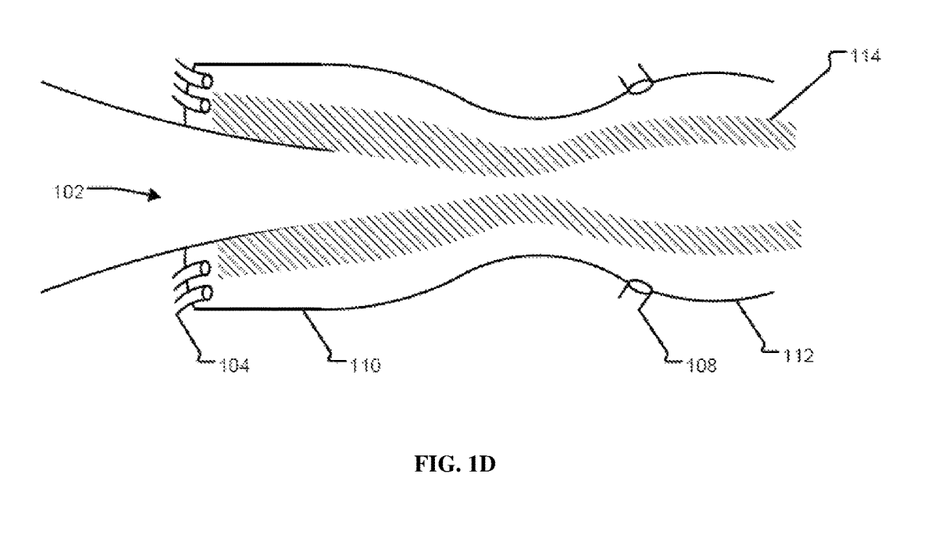

In yet another embodiment, the combustion chamber may have different shapes and/or sizes as illustrated in FIG. 1A and FIG. 1D. The chamber may optionally include one or more walls 110, nozzle, etc. Further, the combustion chamber or exit nozzle 112 may optionally include one or more Ridges/Grooves which can be used to direct or adjust direction of the propellants spinning in the vortex to exit parallel to the rocket in order to increase efficiency and stability.

In another embodiment, the blanket of gases 116 may include any or a combination of unreacted propellant, inert coolant or air depending on the one or more conditions. The blanket of gases 116 may be in the form of a rotating vortex. Further, the vortex of gases 114 may include reacted propellant. Furthermore, the column of air/propellants/inert gasses, etc. 118 may not be rotating as a vortex. The column of air/propellants/inert gases, etc. 118 may only have linear velocity.

In an embodiment, the proposed rocket may have lower costs as staging may not be required. The proposed rocket may require lower cooling than current SSTO designs, thus enabling a higher payload capacity. The proposed rocket may be highly customizable and adjustable to the specific needs, both during the design phase and in-flight. Furthermore, the proposed rocket may be less risky than MSTO rockets as staging may have a high chance of failing.

In another embodiment, the proposed technology may enable the potential use of SSTOs, while increasing payload capacity by decreasing the amount of cooling necessary and also decreasing fuel and staging costs. Further, it may decrease the risk of an in-flight staging failure. It may also enable the ability to adjust the properties of the engine (including exit area) in-flight.

In yet another embodiment, the inlet velocities, pressures, angles, etc. for the propellant and other gases can be adjusted according to the one or more conditions. Such adjustment may be applied during the initial design phase of the engine specific to the rocket and mission, in-flight adjustments made by the on-board rocket computer, the ground control station and/or any other feasible methods of control.

Figure 2A:
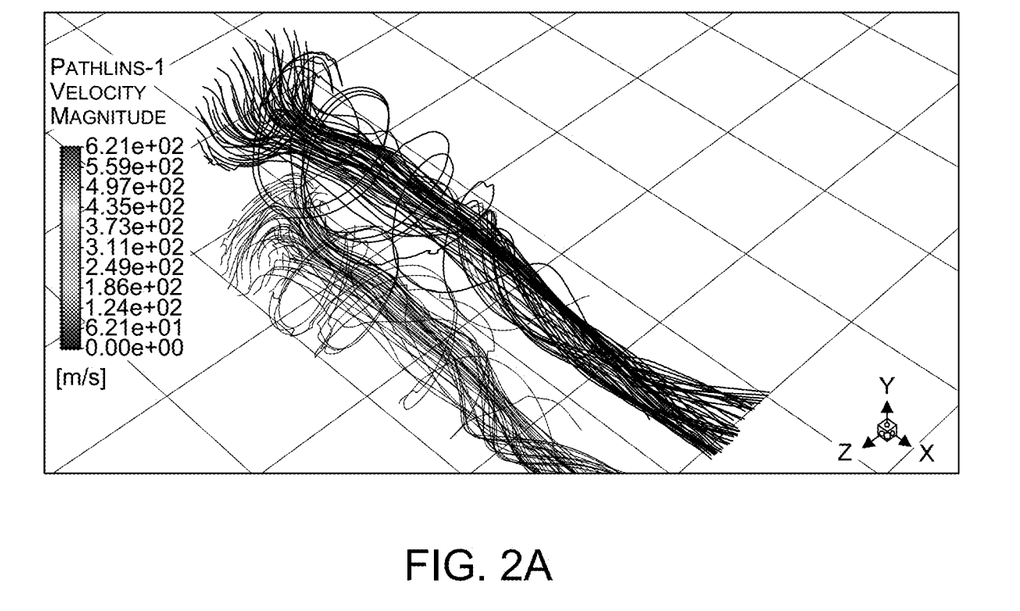
FIGS. 2A-2P illustrate airflow charts based on Computational Fluid Dynamic simulations of the proposed engine, in accordance with embodiments of the present disclosure.
Figure 2B:
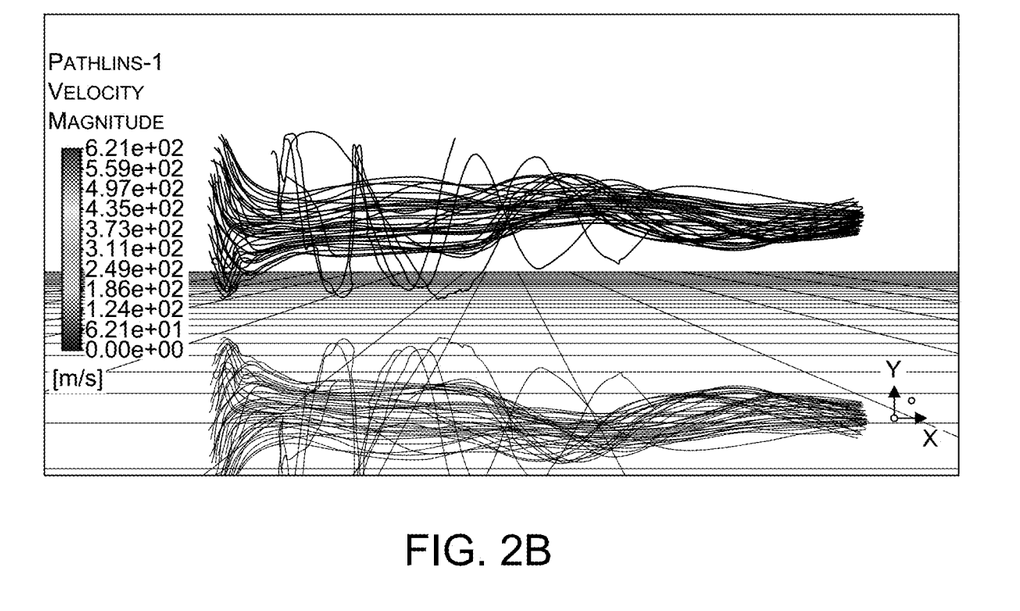
Figure 2C:
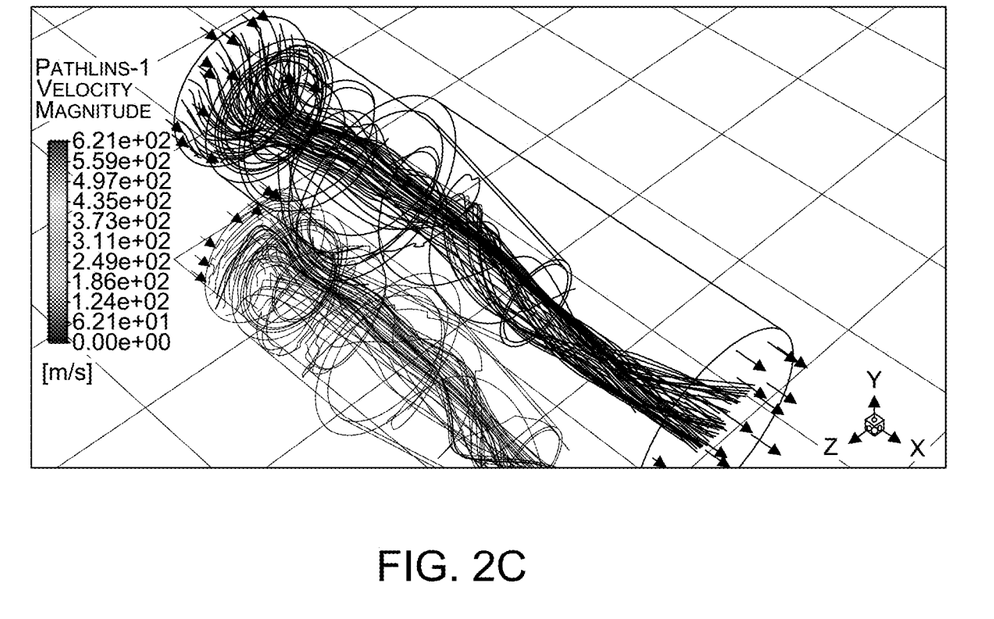
Figure 2D:
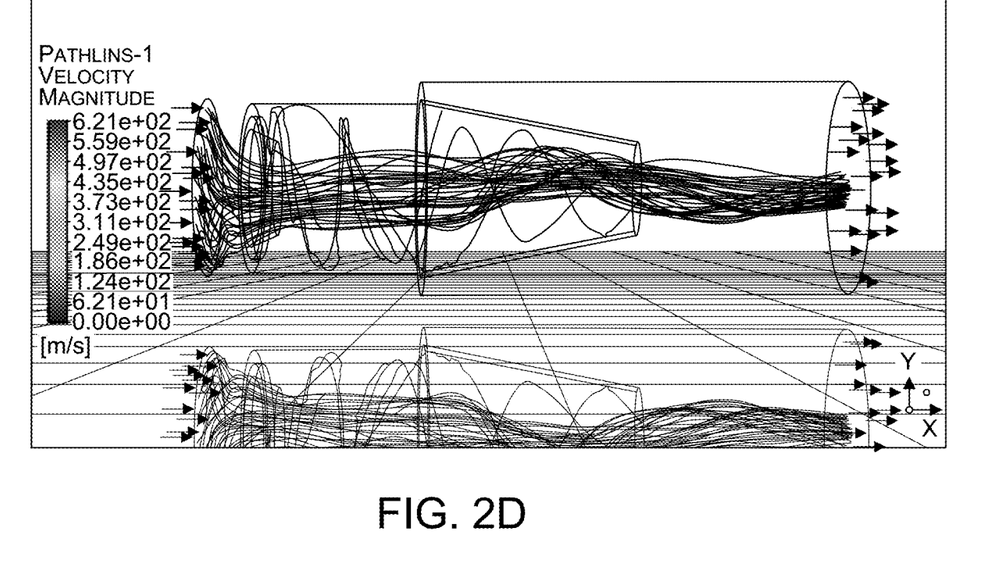
Figure 2E:
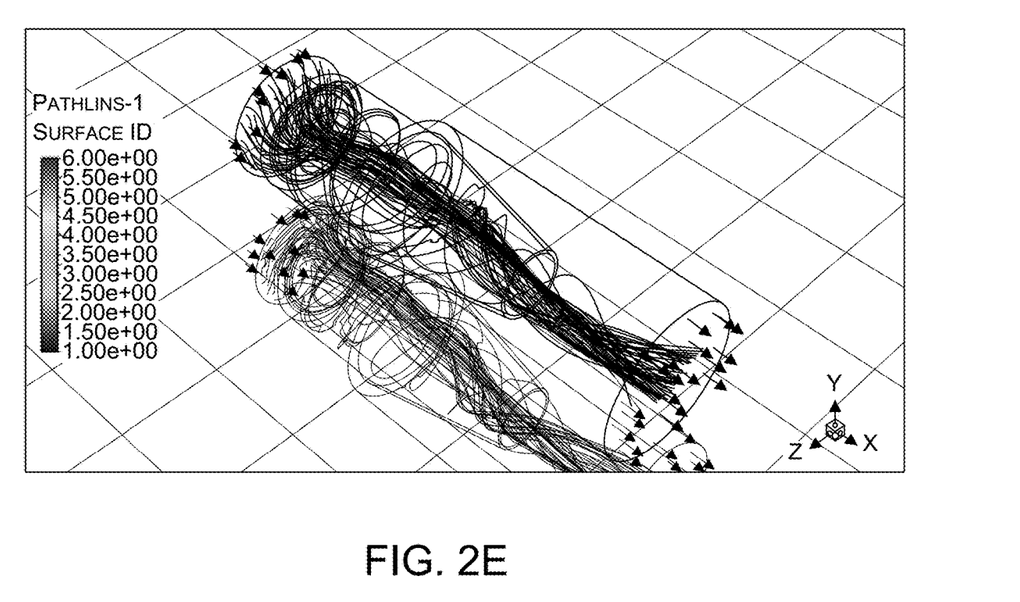
Figure 2F:
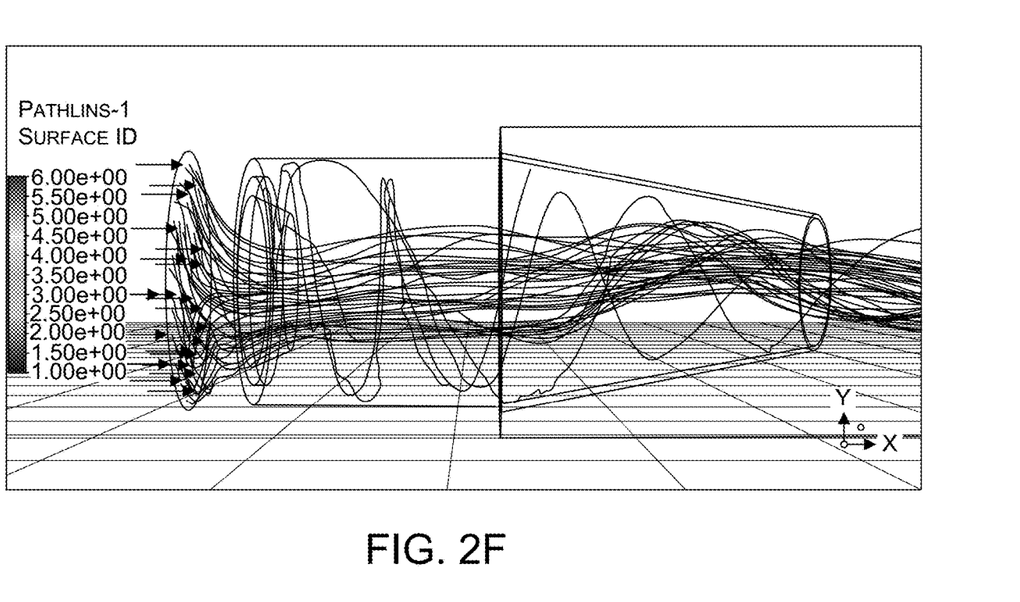
Figure 2G:
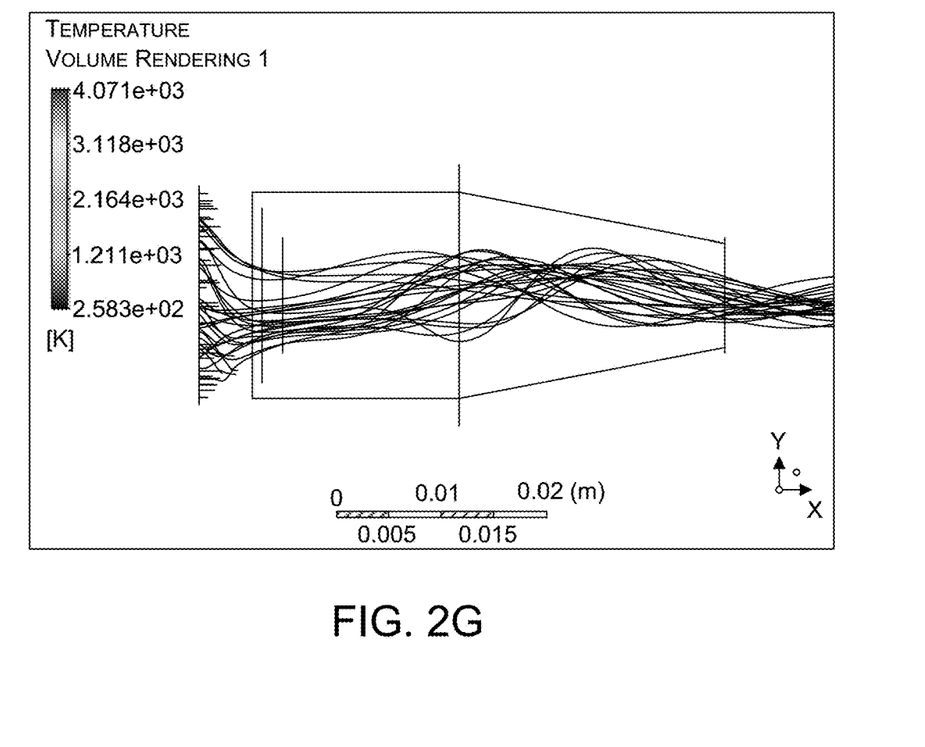
Figure 2H:
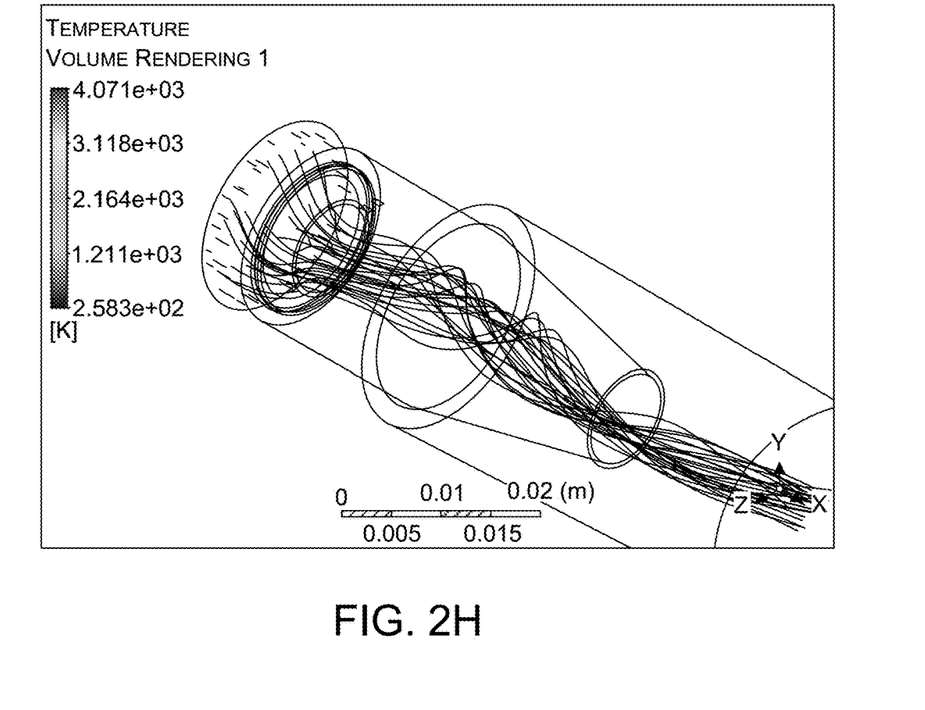
Figure 2I:
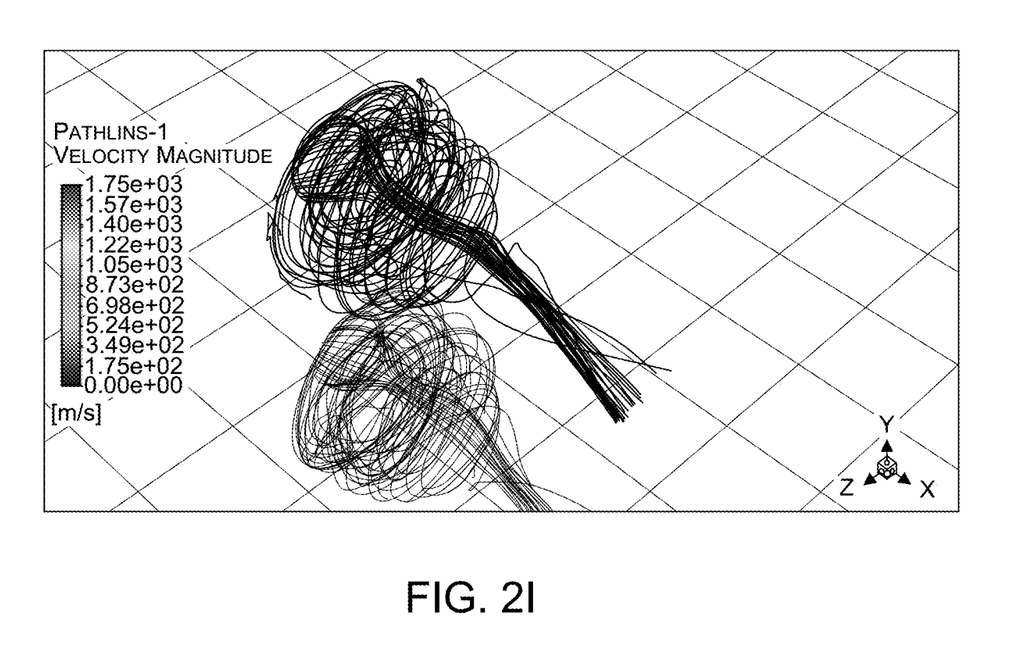
Figure 2J:
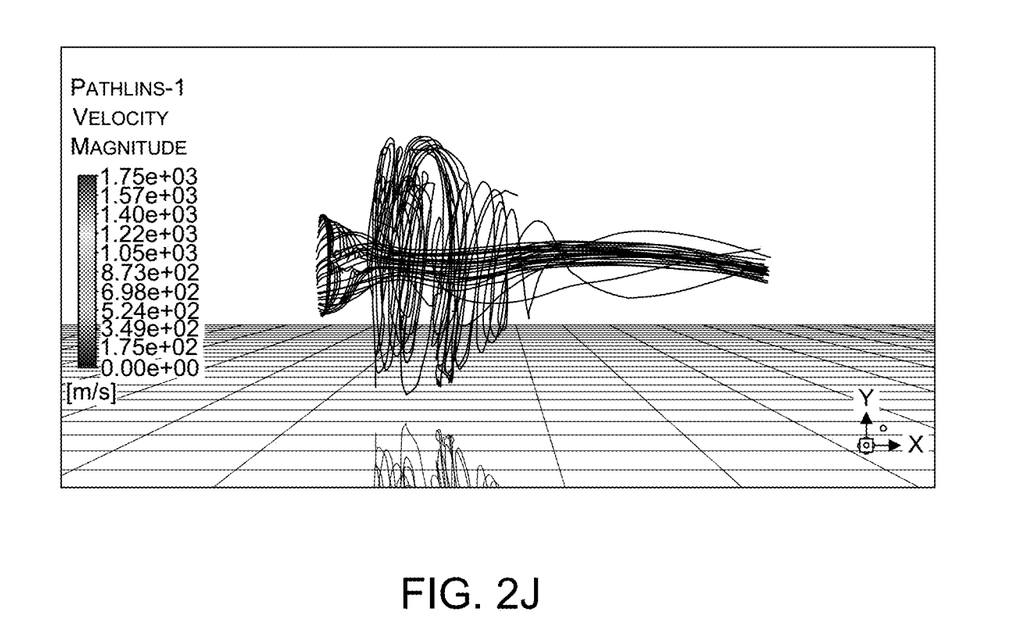
Figure 2K:
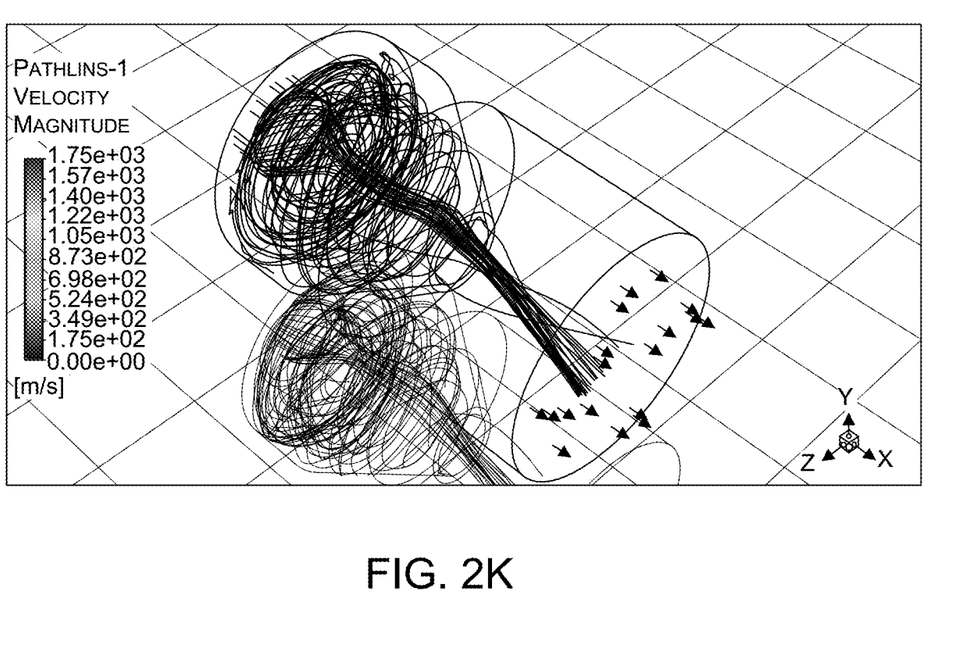
Figure 2L:
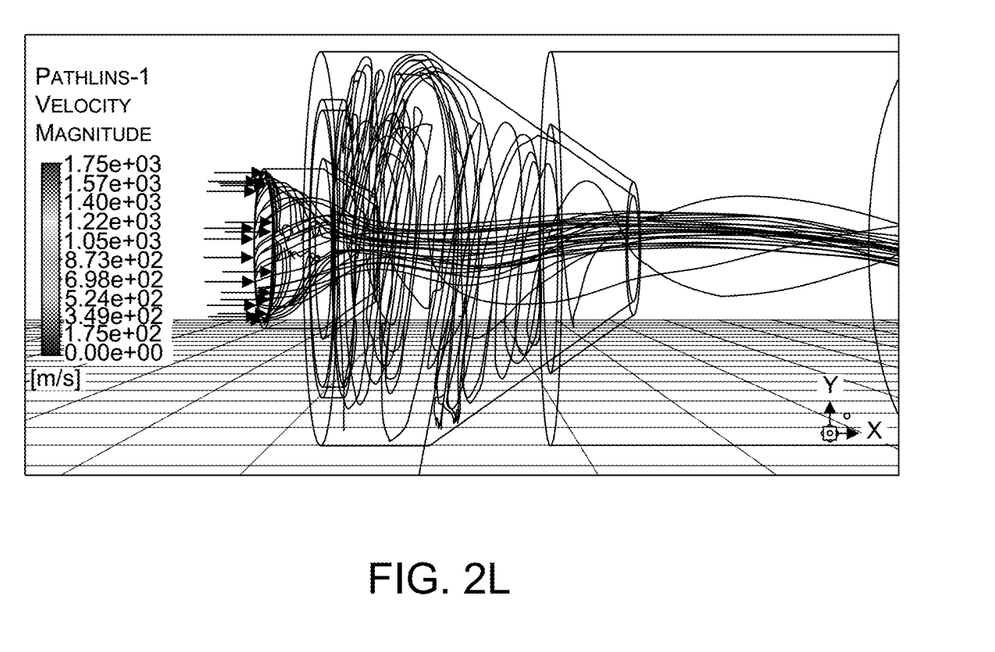
Figure 2M:
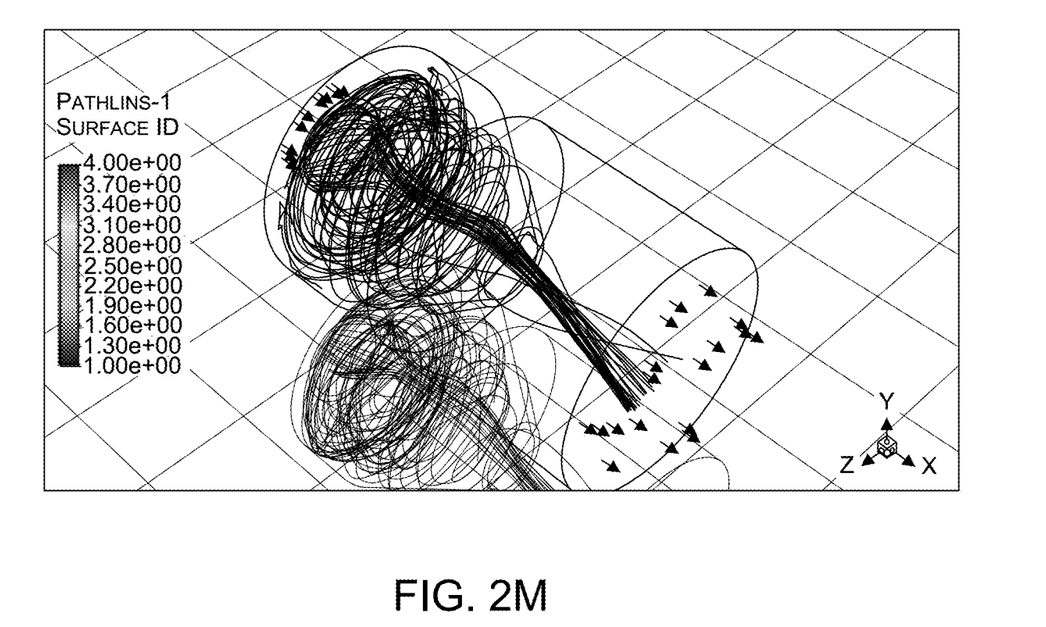
Figure 2N:
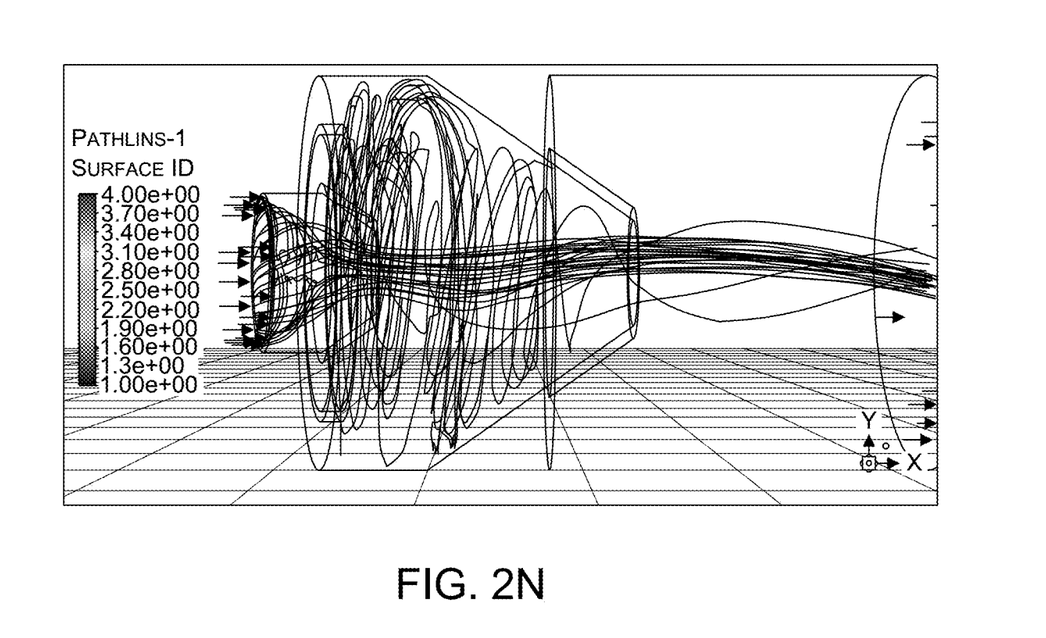
Figure 2O:
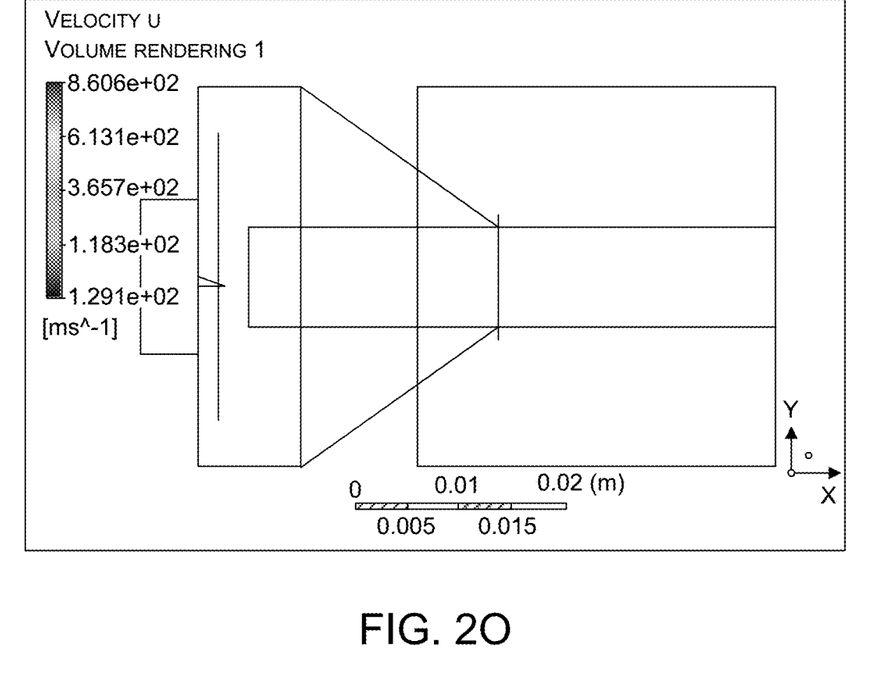
Figure 2P:
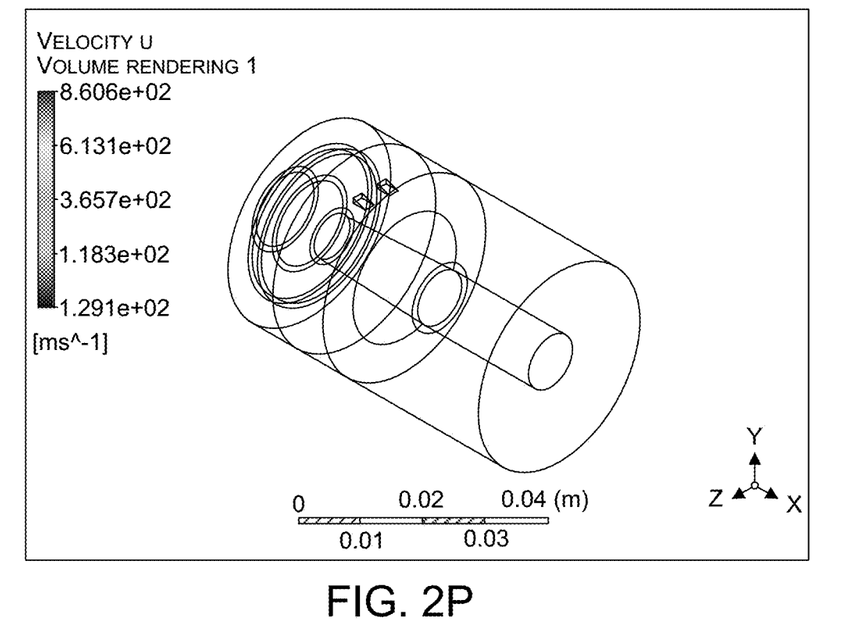

FIGS. 2A-2P illustrate airflow charts based on Computational Fluid Dynamic simulations of the proposed rocket engine, in accordance with embodiments of the present disclosure. In an exemplary embodiment, it may seem that the rocket engine had bad performance, but the reason for suboptimal output may be because the other dimensions (e.g., nozzle, chamber radius, etc.) may be taken randomly, as the simulations are only meant to show the working of the engine in terms of fluid dynamics, and not reflect upon its performance under certain conditions. So, the exact values of the results depicted in FIGS. 2A-2P are exemplary and shouldn't be considered liming in any way.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, to avoid obscuring the present invention.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

ADVANTAGES OF THE INVENTION

The present disclosure provides a rocket engine which can power a Single Stage to Orbit (SSTO) rocket and obviate the above mentioned limitations of conventional rockets.

The present disclosure provides an aerospike nozzle-based rocket engine which doesn't suffer from cooling issues.

The present disclosure provides a rocket engine capable of solving the issue of altitude compensation and staging.

The present disclosure provides a rocket engine having lower cooling needed than current SSTO designs and enabling a higher payload capacity.

The present disclosure provides a rocket engine which is highly customizable and adjustable to the specific needs, both during the design phase and in-flight.

The present disclosure provides a rocket engine which is less risky than Multi Stage to Orbit (MSTO) rockets.

I claim:

1. A vortex-based virtual aerospike engine for powering an aerial vehicle, the engine comprising:
   a combustion chamber, the combustion chamber comprising:
      one or more main inlets configured to spray fuel or oxidizer at a specific angle, where the angle is adjustable for forming a vortex of propellants or gases inside the combustion chamber;

one or more gas inlets configured to let in a column of gases into the combustion chamber in a direction parallel to a longitudinal axis of the vehicle with minimal angular velocity to prevent the column of gases from mixing with the vortex of propellants or gases;

wherein the column of gases inside the combustion chamber forms a virtual aerospike nozzle, the virtual aerospike nozzle exits the gases to propel the vehicle in a specific direction, wherein the virtual aerospike nozzle does not require cooling.

2. The vortex-based virtual aerospike engine as claimed in claim 1, wherein the combustion chamber further comprises:
one or more blanket inlets for injecting a blanket of gases between one or more walls of the combustion chamber; and wherein the blanket inlets are configured to allow release of an inert coolant or the fuel or oxidizer into the combustion chamber in the events of the fuel or oxidizer not being released from the one or more main inlets.

3. The vortex-based virtual aerospike engine as claimed in claim 2, wherein one or more parameters associated with the gas inlet, the one or more main inlets or the one or more blanket inlets is adjusted based on one or more atmospheric conditions, wherein the one or more parameters include velocity, pressure, and angle.

4. The vortex-based virtual aerospike engine as claimed in claim 2, wherein the blanket of gases includes any or a combination of unreacted propellant, inert coolant or air.

5. The vortex-based virtual aerospike engine as claimed in claim 1, wherein the combustion chamber further comprises:
one or more film cooling inlets for letting in an inert coolant into the combustion chamber or the virtual aerospike nozzle.

6. The vortex-based virtual aerospike engine as claimed in claim 1, wherein the combustion chamber further comprises:
a set of ridges or grooves for adjusting direction of propellants or gases spinning in the vortex of propellants or gases such that the propellants or gases exit the chamber in a direction along the longitudinal axis of the vehicle.

7. The vortex-based virtual aerospike engine as claimed in claim 1, wherein the column of gases forms a spiked wick which produces the virtual aerospike nozzle based on adjusting any or a combination of pressure of the column, velocity of the column, angle of the column, or the vortex of the propellants or gases.

8. The vortex-based virtual aerospike engine as claimed in claim 7, wherein the column of gases is adjusted based at least on any or a combination of one or more atmospheric conditions, propellant type, or one or more payload attributes.

9. The vortex-based virtual aerospike engine as claimed in claim 1, wherein the chamber further comprises an exit area through which the vortex of propellants or gases spin and exit, wherein the exit area is adjustable.

10. The vortex-based virtual aerospike engine as claimed in claim 1, wherein the one or more main inlets include either one or more singular fuel or oxidizer inlets, or one or more dual fuel or oxidizer inlets.

* * * * *